US008549467B2

(12) United States Patent
Brukner et al.

(10) Patent No.: US 8,549,467 B2
(45) Date of Patent: Oct. 1, 2013

(54) INTEGRATING SOFTWARE COMPONENTS IN A SOFTWARE SYSTEM USING CONFIGURABLE GLUE COMPONENT MODELS

(75) Inventors: Ofir Meir Brukner, Haifa (IL); Mila Keren, Nesher (IL); Shiri Kremer-Davidson, Yavniel (IL); Julia Rubin, Haifa (IL); Tali Yatzkar-Haham, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 12/639,020

(22) Filed: Dec. 16, 2009

(65) Prior Publication Data

US 2011/0145782 A1 Jun. 16, 2011

(51) Int. Cl.
G06F 9/44 (2006.01)
(52) U.S. Cl.
USPC .......................................... 717/104; 717/106
(58) Field of Classification Search
USPC ................................................ 717/104–109
See application file for complete search history.

(56) References Cited

U.S. PATENT DOCUMENTS

| | | | |
|---|---|---|---|
| 7,133,874 B2 | 11/2006 | Hill et al. | |
| 7,448,022 B1 | 11/2008 | Ram et al. | |
| 7,499,899 B2 | 3/2009 | Sigel et al. | |
| 7,562,346 B2 | 7/2009 | Jhanwar et al. | |
| 2004/0216147 A1 | 10/2004 | Yanosy et al. | |
| 2008/0196004 A1 | 8/2008 | Choi et al. | |

OTHER PUBLICATIONS

Almeida et al., "Platform-independent dynamic reconfiguration of distributed applications", 2004, IEEE, pp. 1-6.*
Heuvel, "To Adapt or Not to Adapt, That is the Question: Towards a Framework to Analyze Scenarios for Aligning Legacy and Business Components", 2007, Enterprise Interoperability—Springer Link, pp. 45-54.*
Leena Arhippainen, "Use and integration of third-party components in software development"; VTT Publications, Espoo 2003.
Vigder, M., Dean, J., An architectural approach to building systems from COTS software components. In: Proceedings of the 22nd Annual Software Engineering Workshop, Greenbelt, Maryland, 1997.
Gannod, G., Mudiam, S., Lindquist, T., An architectural-based approach for synthesizing and integrating adapters for legacy software. In: Seventh Working Conference on Reverse Engineering (WCRE'00), Brisbane, Australia, 2000.

(Continued)

Primary Examiner — Ted T Vo

(57) ABSTRACT

A method that includes: modeling a software system having pairs of coupled software components to yield a platform-independent model of pairs of respective platform-independent software component models associated with platform-specific software components; applying a materialization process to the platform-independent model to yield a platform-specific model by selecting respective concrete platform specific software components for the software component models; analyzing the platform-specific model to identify mismatched pairs of concrete platform-specific software components; re-modeling the platform-specific model such that each identified mismatched pair becomes coupled together via a configurable glue component model which comprises interface maps usable to eliminate the mismatch; configuring the glue component models by determining, in response to a feedback from a user, code snippets associated with any of the interface maps; and transforming the configured glue component model into a computer code in the platform-specific language by assembling all code snippets into a single piece of code.

21 Claims, 5 Drawing Sheets

(56) References Cited

OTHER PUBLICATIONS

W. Zhao, et. al., "Automated Glue/Wrapper Code Generation in Integration of Distributed and Heterogeneous Software Components," Enterprise Distributed Object Computing Conference, Eighth IEEE International (EDOC'04), 2004.

Heikki Kontio, "Current trends in software industry:COTS Integration", URL: http://www.cs.helsinki.fi/u/paakki/Kontio.pdf, Current trends in software industry:COTS Integration, 2008.

Guido van Rossum, "Glue It All Together With Python", 1998. URL: www.python.org/doc/essays/omg-darpa-mcc-position.html.

Brian W. Beach, "Connecting Software Components with Declarative Glue", 1991. URL: http://www.hpl.hp.com/techreports/91/HPL-91-152.pdf.

Romain Rouvoy et al, "Towards a Model-Driven Approach to Build Component-Based Adaptable Middleware", 2004. http://www.comp.lancs.ac.uk/computing/research/mpg/reflection/papers/p195-rouvoy.pdf.

Aniruddha Gokhale et al, "Model Driven Middleware:A New Paradigm for Developing Distributed Real-Time and Embedded Systems", 2005. URL: http://www-scf.usc.edu/~gedwards/pubs/elsevier-mda04.pdf.

Christian Bunse et al, "Embedded System Construction—Evaluation of a Model-Driven and Component-Based Develpoment Approach", 2008, URL: http://swerl.tudelft.nl/twiki/pub/Main/TechnicalReports/TUD-SERG-2008-020.pdf.

Vorgelegt et al, "Model-Driven Development of QOS Enabled Distributed Applications", 2004, URL:http://edocs.tu-berlin.de/diss/2004/weis_torben.pdf.

\* cited by examiner

INTEGRATING SOFTWARE COMPONENTS IN A SOFTWARE SYSTEM USING CONFIGURABLE GLUE COMPONENT MODELS

BACKGROUND

1. Technical Field

The present invention relates to computer software integration and more particularly, to integrating software components of various types.

2. Discussion of the Related Art

Current trends in software product lines are characterized in an increasing use of software components obtained from specialized suppliers. A company that is in the middle of a supply chain has to integrate components from its suppliers for its customers. To cover the varying customer needs, it may be necessary to implement a particular feature of components, each obtained from a different supplier. The integration of these components by additional glue artifacts becomes a bottleneck of the supply chain building since a number of component variants require differentiated code that can not be prepared ahead for all possible combinations. Automation of the gluing process is one of the challenging requirements of the embedded software development process.

BRIEF SUMMARY

One aspect of the invention provides a method comprising: modeling a software system having pairs of coupled software components to yield a platform-independent model of pairs of respective platform-independent software component models, such that each software component model being a placeholder associated with a respective variable set of concrete platform-specific software components; applying a materialization process to the platform-independent model to yield a platform-specific model by selecting respective concrete platform-specific software components for at least some of the software component models; analyzing the platform-specific model to identify mismatched pairs of concrete platform-specific software components; re-modeling the platform-specific model such that each identified mismatched pair becomes coupled together via a configurable glue component model which comprises, inter alia, interface maps usable to eliminate the mismatch; configuring the glue component models by determining, in response to a feedback from a user, at least: the interface maps, methods associated with the determined interface maps, parameters associated with the determined methods, and code snippets associated with at least one of the determined interface maps, the determined method maps and the determined parameters; and transforming the configured glue component model into a computer code in the platform-specific language by assembling all determined code snippets into a single piece of code, wherein at least one of: the modeling, the applying, the analyzing, the re-modeling, the configuring, and the transforming is performed by at least one computer.

Another aspect of the invention provides A system comprising: a modeler arranged to model a software system having pairs of coupled software components to yield a platform-independent model of pairs of respective platform-independent software component models, such that each software component model being a placeholder associated with a respective variable set of concrete platform-specific software components The model may be a special variability pattern for connecting platform-independent model components as placeholder for alternative platform-specific or supplier-specific model components; a materialization module arranged to apply a materialization process to the platform-independent model to yield a platform-specific model by selecting respective concrete platform-specific software components for at least some of the software component models; a compatibility analyzer arranged to analyze the platform-specific model to identify mismatched pairs of concrete platform-specific software components; a re-modeler arranged to re-model the platform-specific model such that each identified mismatched pair becomes coupled together via a configurable glue component model which comprises interface maps usable to eliminate the mismatch; a user interface arranged to configure the glue component models by determining, in response to a feedback from a user, at least: the interface maps, methods associated with the determined interface maps, parameters associated with the determined methods, and code snippets associated with at least one of the determined interface maps, the determined method maps, and the determined parameters; and a converter arranged to transform the configured glue component model into a computer code in the platform-specific language by assembling all determined code snippets into a single piece of code, wherein at least one of the modeler, the materialization module, the compatibility analyzer, the re-modeler, the user interface, and the converter are implemented, at least partially by at least one processor.

Yet another aspect of the invention provides a computer program product, the computer program product comprising: a computer readable storage medium having computer readable program embodied therewith, the computer readable program comprising: computer readable program configured to model a software system having pairs of coupled software components to yield a platform-independent model of pairs of respective platform-independent software component models, such that each software component model being a placeholder associated with a respective variable set of concrete platform-specific software components; computer readable program configured to apply a materialization process to the platform-independent model to yield a platform-specific model by selecting respective concrete platform-specific software components for at least some of the software component models; computer readable program configured to analyze the platform-specific model to identify mismatched pairs of concrete platform-specific software components; computer readable program configured to re-model the platform-specific model such that each identified mismatched pair becomes coupled together via a configurable glue component model which comprises interface maps usable to eliminate the mismatch; computer readable program configured to configure the glue component models by determining, in response to a feedback from a user, at least: the interface maps, methods associated with the determined interface maps, parameters associated with the determined methods, and code snippets associated with at least one of the determined interface maps, the determined method maps, and the determined parameters; and computer readable program configured to transform the configured glue component model into a computer code in the platform-specific language by assembling all determined code snippets into a single piece of code.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
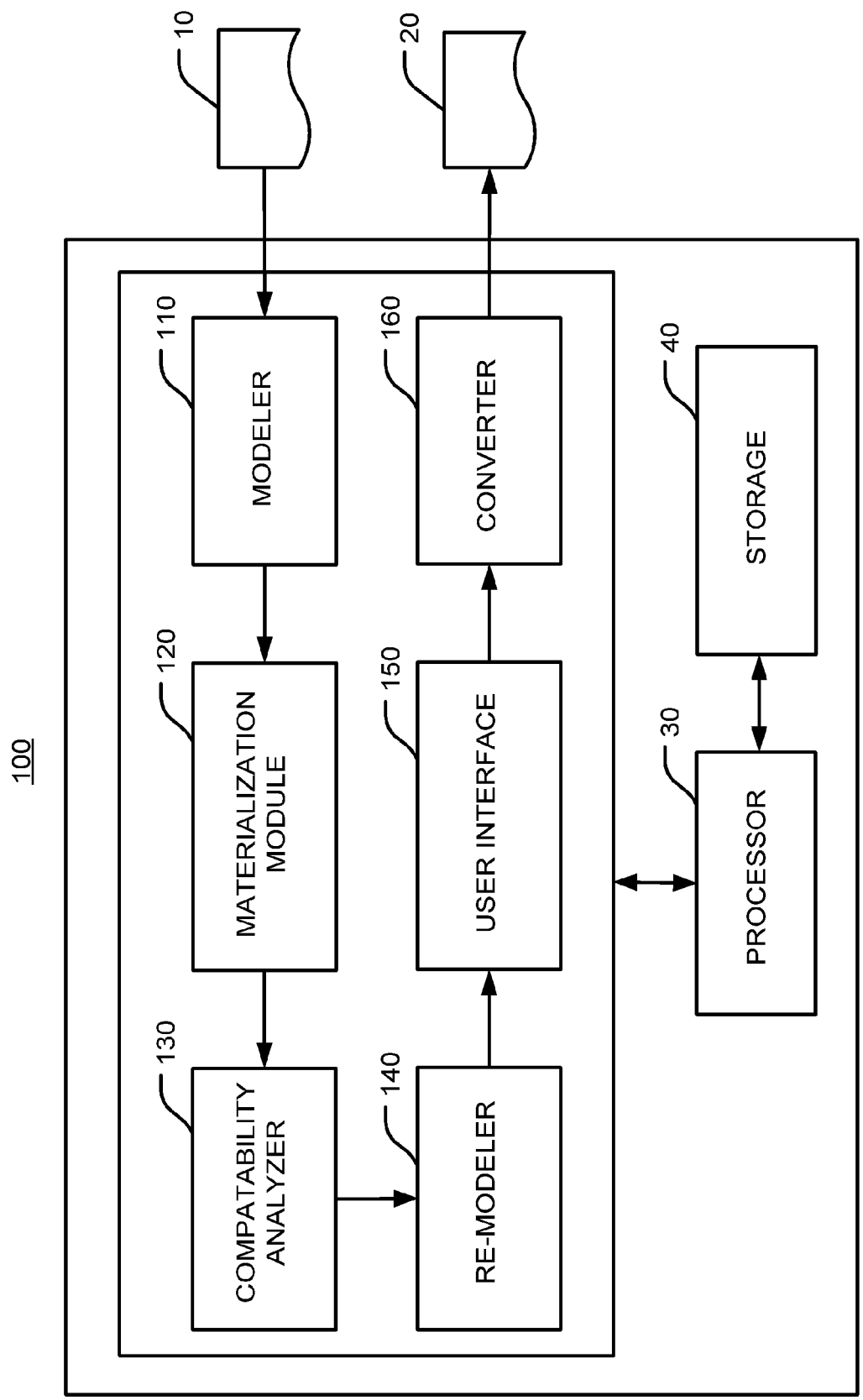
FIG. 1 is a high level schematic block diagram illustrating a system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "software system" as used herein in this application refers to a system based on software forming part of a computer system (a combination of hardware and software). The term software system is related to the application of systems theory approaches in software engineering context. Examples of software systems include computer reservations system, air traffic control software, military command and control systems, telecommunication networks, web browsers, content management systems, database management systems, expert systems, spreadsheets, word processors, and the like.

The term "software component" as used herein in this application refers to a software package, or a module, that encapsulates a set of related functions or data. All system processes are placed into separate components so that all of the data and functions inside each component are semantically related Software components may be coupled together via interfaces.

The term "platform-independent model" as used herein in this application refers to is a model of a software system or business system that is independent of the specific technological platform used to implement it. The term platform-independent model is most frequently used in the context of the model-driven architecture approach.

The term "platform-specific model" as used herein in this application, relates to a model of a software or business system that is linked to a specific technological platform (e.g. a specific programming language, operating system or database). Platform-specific models are indispensable for the actual implementation of a system.

The term "glue component" as used herein in this application, refers to a software component that enables two software components to work together. Specifically, it eliminates the functional and formal mismatch between two software components that are integrated together.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating a system according to some embodiments of the invention. The system 100 includes a modeler 110, a materialization module 120, a compatibility analyzer 130, a re-modeler 140, a user interface 150, and a converter 160. System 100 may be implemented on a computer that includes, in some embodiments, a processor 30 and a storage module 40.

Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

Figure 2:
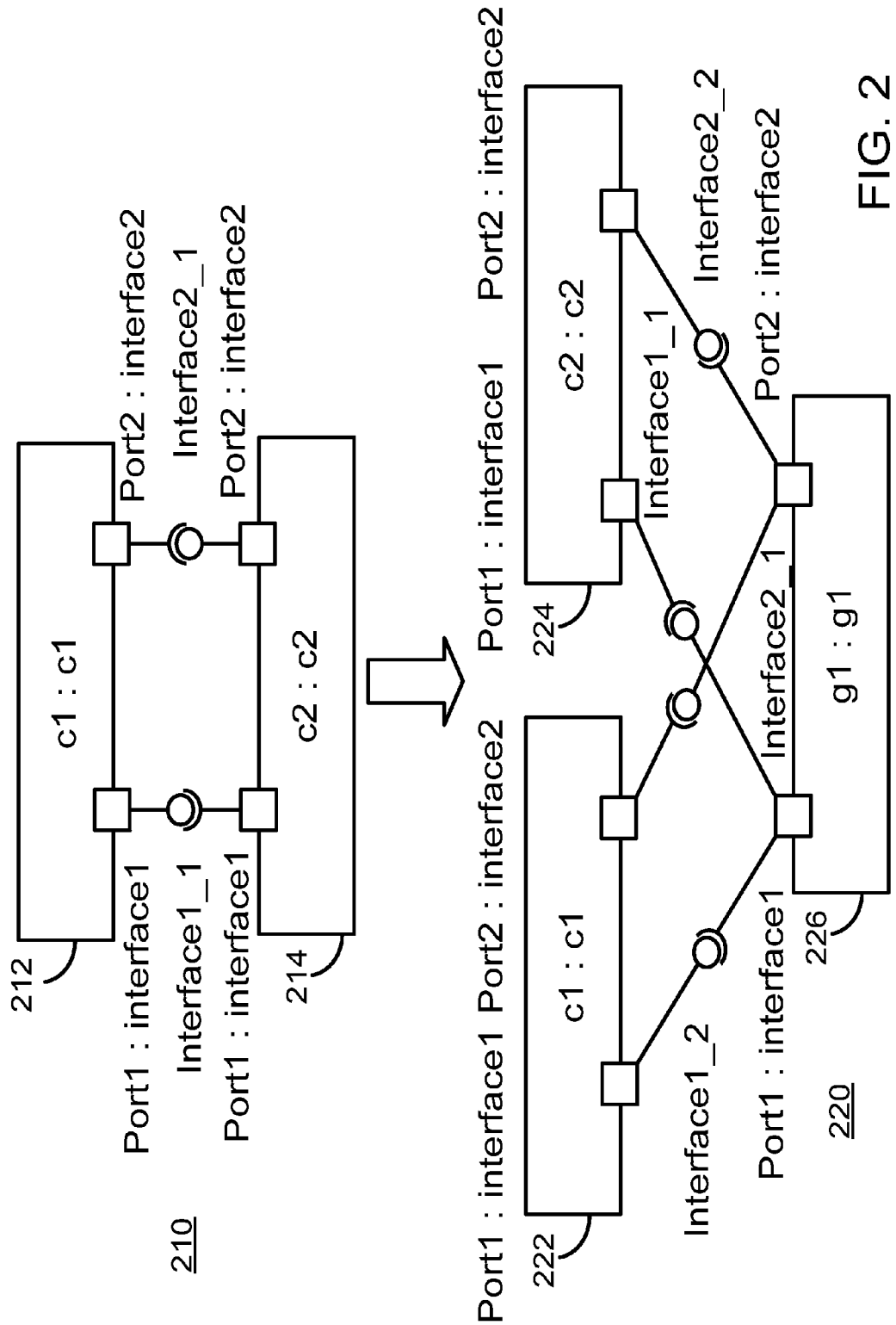
FIG. 2 is a model fragment diagram illustrating an aspect according to some embodiments of the invention.

FIG. 2 is a model fragment diagram illustrating an aspect according to some embodiments of the invention. The diagram shows two models of a software component, one being platform independent 210 and the other being platform specific model 220. Platform-specific model 210 comprises a first component model 212 having two ports Port1 and Port2. Second component model 214 respective Port1 and Port2. The two components 212 and 214 are connected to each other via Interface1_1 and Interface2_2. Platform specific model 220 comprises a first component model 222, a second component model 224, and a glue component model 226, between them, wherein all components exhibit two ports. The ports of the glue component 226 may have several interfaces: one provides and at least one or more required Specifically, Port1 of component 222 is connected to Port1 of glue component 226. Port1 of glue component 226 is connected to Port1 of component 224. Similarly, Port2 of component 222 is connected to Port2 of glue component 226, and Port2 of glue component 226 is connected to Port2 of component 224.

In operation, modeler 110 is arranged to model a software system having pairs of coupled software components (e.g., in a form of a software code 10) to yield a platform-independent model of pairs of respective platform-independent software component models (e.g., model 210), such that each software component model being a placeholder associated with a respective variable set of concrete platform-specific software components.

Materialization module 120 is arranged to apply a materialization process to the platform-independent model to yield a platform-specific model by selecting respective concrete platform-specific software components for at least some of the software component models. The aforementioned selection may be automatically by system 100, semi automatically in response to a user input, or manually in response to a user's selection.

Compatibility analyzer 130 is arranged to analyze the platform-specific model to identify mismatched pairs of concrete platform-specific software components. The analysis of components match may be performed according to at least of the following criteria: connected ports that have pairs of same-named interfaces on opposite sides (provides vs. required); method signatures being identical including method names and parameters (number, order and types); and identical component technologies. If at least one of the aforementioned criteria fails, the components are considered as mismatched and their integration is required.

Further on, re-modeler 140 is arranged to re-model the platform-specific model such that each identified mismatched pair becomes coupled together via a configurable glue component model which comprises interface maps usable to eliminate the mismatch. As shown in FIG. 2, the re-modeling of platform independent model 210 into platform specific model 220 yields glue component 226. Specifically, during the re-modeling, for each pair of mismatched components one glue component is added.

Figure 3:
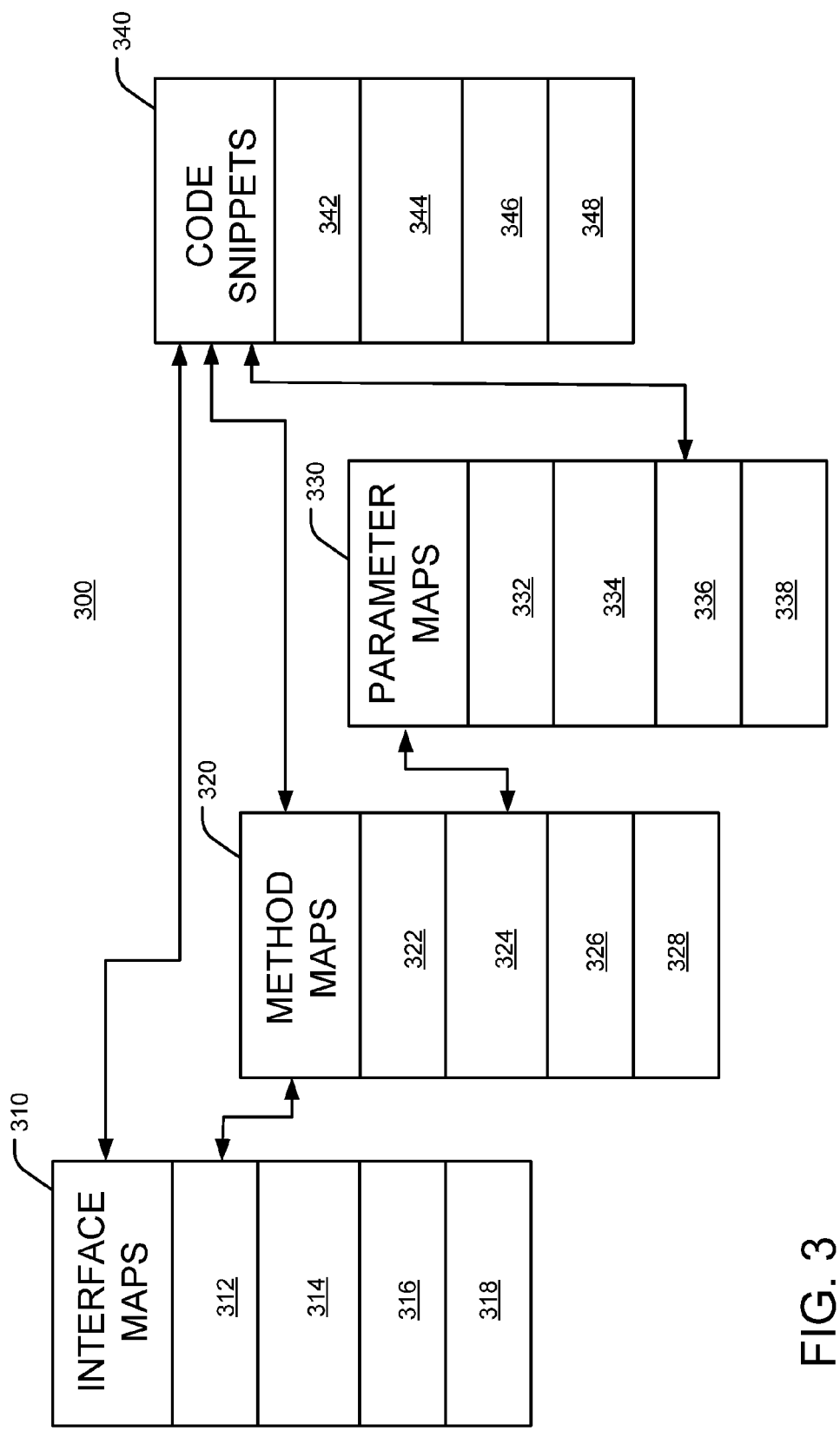
FIG. 3 is a schema illustrating relations of map elements according to some embodiments of the invention.

FIG. 3 is a schema 300 illustrating an aspect according to some embodiments of the invention. The model of the glue component 226 contains, inter alia, a set of interface maps 310 (312-318), from which method maps may be derived 320 (322-328), each method map is associated with respective parameter map 330. Additionally, each of interface maps 310, method maps 320, and parameter maps 330 in turn is associated with a respective code snippet 340 (342-348). The code may be user-provided or alternatively selected by the user over dialog boxes, from libraries holding basic code blocks. Any of the maps' dialogs or maps' graphical user interfaces for creating maps may be presented to the user in a form of menus, selection tabs, dialog boxes and the like, all of which involve at least some user feedback on top of the systems determination and configuring.

Platform specific model 220, including glue component 226, may be manipulated by a software development tool having a user via user interface 150 for configuring glue component 226. According to some embodiments, user interface 150 is arranged to configure a glue component model, such as 226, by determining, in response to the user's selection, glue properties such as the technology used, wrapping, in required (if the two integrated components are of different technologies), and initialization of glue component 226, if required.

According to some embodiments of the invention, the determining of the code snippets is aided by selection from specified libraries of code snippets, either as some programming language code or as templates with parameters to be assigned by values during glue configuration. Additionally, determined code snippets may be editable or written entirely by a user.

Additionally, glue component 226 has further configurable attributes that may yield additional code. One of such attributes is related to subscription support, when one of the glued ends required subscribe-notify message exchange but the other end doesn't know about it using specific naming convention for executor or invocator of initialization and destruction requests.

After glue component has been configured (maps, parameters, code snippets), converter 160 is arranged to transform the configured glue component model into a computer code in the platform-specific language by assembling all determined code snippets into a single piece of code e.g., in a form of a software code 20.

According to some embodiments of the invention, the determining of the interface maps provide initial content based on the user's naming hint, and wherein the content is editable by the user.

Figure 4:
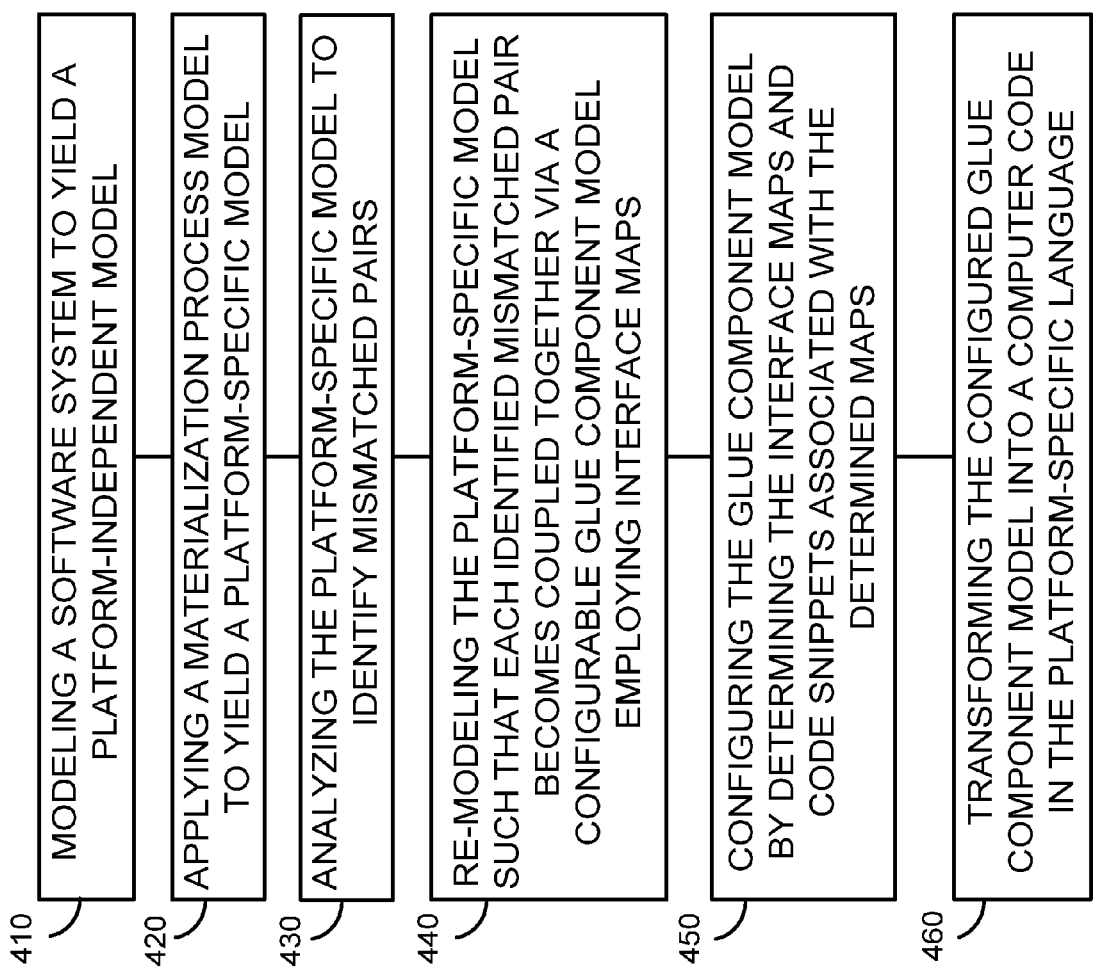
FIG. 4 is a high level flowchart diagram illustrating a method according to some embodiments of the invention.

FIG. 4 is a high level flowchart diagram illustrating a method according to some embodiments of the invention. The method, which is not necessarily associated with the aforementioned architecture of system 100 may include: modeling a software system having pairs of coupled software components to yield a platform-independent model of pairs of respective platform-independent software component models, such that each software component model being a placeholder associated with a respective variable set of concrete platform-specific software components 410; applying a materialization process to the platform-independent model to yield a platform-specific model by selecting respective concrete platform-specific software components for at least some of the software component models 420; analyzing the platform-specific model to identify mismatched pairs of concrete platform-specific software components 430; re-modeling the platform-specific model such that each identified mismatched pair becomes coupled together via a configurable glue component model which comprises interface maps usable to eliminate the mismatch 440; configuring the glue component models by determining, in response to a feedback from a user, at least: the interface maps, method maps associated with the determined interface maps, parameter maps associated with the determined method maps, and code snippets associated with at least one of the determined interface maps, the determined method maps, and the determined parameter maps 450; and transforming the configured glue component model into a computer code in the platform-specific language by assembling all determined code snippets into a single piece of code 240.

Figure 5:
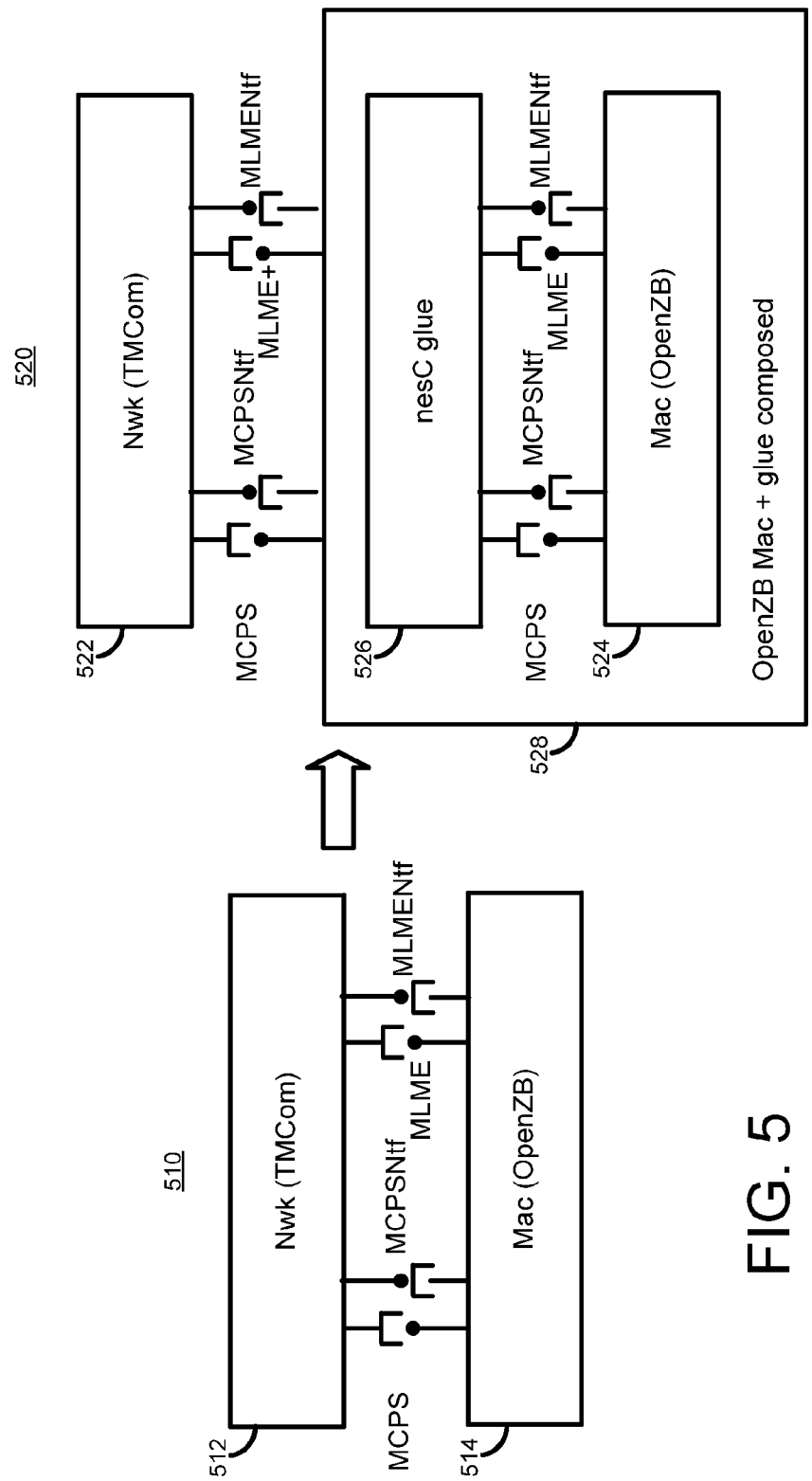
FIG. 5 is a model fragment diagram illustrating an aspect according to some embodiments of the invention.

FIG. 5 is a model fragment diagram illustrating an aspect of the present invention. Components pair 510 which includes component 512 and 514 (both of different technologies) is transformed, by the aforementioned remodeling, into a pair 520 of components 522 and 524 coupled by glue component 526. According to some embodiments of the invention, since components 512 and 514 are implemented in different technologies, an additional code is needed in order to build a wrapper of the glue with one of its target ends that can interact with the other technology end. In order to support this, an additional dependency connection, called "wrapper end" 528, may be added to model between the glue and the component whose technology is selected for the wrapping. Specifically, an additional wrapping module 170 may be added to system 100 to support this functionality.

Advantageously, embodiments of the present invention support the more complicated cases of component integration when the component variants are implemented with interfaces split by different ways. For this case, the interface map meta-class includes one provided interface entry but a number of required interface entries. Also, the provided interface may participate in a number of maps by a subset of its methods mapped to callee methods of different required interfaces According to some embodiments of the invention, some of the glue component models may be arranged to eliminate the mismatch of more than one pair of software components. Advantageously, such split glue component may address cross-pairs integration issues.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A computerized method comprising:
   modeling a software system having pairs of coupled software components to yield a platform-independent model of pairs of respective platform-independent software component models, such that each software component model being a placeholder associated with a respective variable set of concrete platform-specific software components;
   applying a materialization process to the platform-independent model to yield a platform-specific model by selecting respective concrete platform-specific software components for at least some of the software component models;
   analyzing using a processor the platform-specific model to identify automatically mismatched pairs of concrete-platform-specific software components;
   automatically re-modeling the platform-specific model such that each automatically identified mismatched pair becomes coupled together via a configurable glue component model which comprises interface maps usable to eliminate the mismatch;
   configuring the respective glue component model of each of the mismatched pairs by determining, in response to a feedback from a user, at least: the interface maps, method maps associated with the_determined interface maps, parameter maps associated with the determined methods, and code snippets associated with at least one of the determined interface maps, the determined method maps, and the determined parameter maps; and
   transforming each configured glue component model into a computer code in the platform-specific language to eliminate the respective mismatch, said glue component model is transformed by assembling all determined code snippets into a single piece of code.

2. The computerized method according to claim 1, wherein the configuring further comprises determining, for each component, respective initialization and message-exchange support.

3. The computerized method according to claim 1, wherein the determining of the interface maps provides initial content based on the user's naming hint, and wherein the content is editable by the user.

4. The computerized method according to claim 1, wherein for each pair having software components implemented in different technologies, the configuring further comprises wrapping one of the components of the pair in a wrap usable for integrating, on technology level, between the components, and wherein the transforming further yields a corresponding wrapper code usable for the assembling.

5. The computerized method according to claim 1, wherein the determining of the code snippets is aided by selection from specified libraries of code snippets.

6. The computerized method according to claim 1, wherein the determined code snippets are editable by the user.

7. The computerized method according to claim 1, wherein at least one glue component is arranged to eliminate the mismatch of more than one pair.

8. A system comprising:
   a processor;
   a modeler arranged to model a software system having pairs of coupled software components to yield a platform-independent model of pairs of respective platform-independent software component models, such that each software component model being a placeholder associated with a respective variable set of concrete platform-specific software components;

a materialization module arranged to apply a materialization process to the platform-independent model to yield a platform-specific model by selecting respective concrete platform-specific software components for at least some of the software component models;

a compatibility analyzer arranged to analyze using the processor the platform-specific model to identify automatically mismatched pairs of concrete platform-specific software components;

a re-modeler arranged to re-model automatically the platform-specific model such that each identified mismatched pair becomes coupled together via a at least one configurable glue component model which comprises interface maps usable to eliminate the mismatch;

a user interface arranged to configure the at least one glue component model to eliminate the mismatch by determining, in response to a feedback from a user, at least: the interface maps, method maps associated with the determined interface maps, parameter maps associated with the determined method maps, and code snippets associated with at least one of the determined interface maps, the determined method maps, and the determined parameter maps; and a converter arranged to transform the at least one configured glue component model into a computer code in the platform-specific language to eliminate the mismatch, said glue component model is transformed by assembling all determined code snippets into a single piece of code.

9. The system according to claim 8, wherein the user interface is further arranged to configure, by determining in response to a feedback from a user, for each component, respective initialization and message-exchange support.

10. The system according to claim 8, wherein the determining of the interface maps provides initial content based on the user's naming hint, and wherein the content is editable by the user.

11. The system according to claim 8, further comprising a wrapper, wherein for each pair having software components implemented in different technologies, the wrapper is arranged to wrap one of the components of the pair in a wrap usable for integrating, on technology level, between the components, and wherein the converter is further arranged to yield a corresponding wrapper code usable for the assembling.

12. The system according to claim 8, wherein the determining of the code snippets is aided by selection from specified libraries of code snippets.

13. The system according to claim 8, wherein the determined code snippets are editable by the user.

14. The system according to claim 8, wherein at least one glue component is arranged to eliminate the mismatch of more than one pair.

15. A computer program product, the computer program product comprising:

a computer readable storage medium having computer readable program embodied therewith, the computer readable program comprising:

computer readable program configured to model a software system having pairs of coupled software components to yield a platform-independent model of pairs of respective platform-independent software component models, such that each software component model being a placeholder associated with a respective variable set of concrete platform-specific software components;

computer readable program configured to apply a materialization process to the platform-independent model to yield a platform-specific model by selecting respective concrete platform-specific software components for at least some of the software component models;

computer readable program configured to analyze the platform-specific model to identify automatically mismatched pairs of concrete platform-specific software components;

computer readable program configured to re-model the platform-specific model such that each identified mismatched pair becomes coupled together via at least one configurable glue component model which comprises interface maps usable to eliminate the mismatch;

computer readable program configured to configure the glue component models by determining, in response to a feedback from a user, at least: the interface maps, method maps associated with the determined interface maps, parameter maps associated with the determined method maps, and code snippets associated with at least one of the determined interface maps, the determined method maps, and the determined parameter maps; and computer readable program configured to transform the configured glue component model into a computer code in the platform-specific language to eliminate the mismatch, said glue component model is transformed by assembling all determined code snippets into a single piece of code.

16. The computer program product according to claim 15, wherein the computer readable program configured to configure the glue component models, is further configured to determine in response to a feedback from a user, for each component, respective initialization and message-exchange support.

17. The computer program product according to claim 15, wherein the determining of the interface maps provides initial content based on the user's naming hint, and wherein the content is editable by the user.

18. The computer program product according to claim 15, further comprising computer readable program configured to wrap, for each pair having software components implemented in different technologies, one of the components of the pair in a wrap usable for integrating, on technology level, between the components, to yield a corresponding wrapper code usable for the assembling.

19. The computer program product according to claim 15, wherein the determining of the code snippets is aided by selection from specified libraries of code snippets.

20. The computer program product according to claim 15, wherein the determined code snippets are editable by the user.

21. The computer program product according to claim 15, wherein at least one glue component is arranged to eliminate the mismatch of more than one pair.

* * * * *